United States Patent
Giron et al.

(10) Patent No.: US 10,378,689 B2
(45) Date of Patent: Aug. 13, 2019

(54) PIG TRACKING BY UNMANNED SUBMARINE

(71) Applicant: Halliburton Energy Services, Inc., Houston, TX (US)

(72) Inventors: Casey Giron, Cypress, TX (US); Wolfgang Hartmut Nitsche, Humble, TX (US); John Laureto Maida, Jr., Houston, TX (US); Satyan Gopal Bhongale, Cypress, TX (US); Li Gao, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 57 days.

(21) Appl. No.: 15/301,325

(22) PCT Filed: Nov. 9, 2015

(86) PCT No.: PCT/US2015/059707
§ 371 (c)(1),
(2) Date: Sep. 30, 2016

(87) PCT Pub. No.: WO2017/082857
PCT Pub. Date: May 18, 2017

(65) Prior Publication Data
US 2017/0268714 A1    Sep. 21, 2017

(51) Int. Cl.
*F16L 55/48* (2006.01)
*G05D 1/12* (2006.01)
*G05D 1/02* (2006.01)

(52) U.S. Cl.
CPC ............ *F16L 55/48* (2013.01); *G05D 1/0206* (2013.01); *G05D 1/12* (2013.01)

(58) Field of Classification Search
None
See application file for complete search history.

(56) References Cited

U.S. PATENT DOCUMENTS

| 5,579,285 | A | * | 11/1996 | Hubert ............... G01S 5/0009 367/133 |
| 5,736,821 | A | | 4/1998 | Suyama |
| 6,816,110 | B1 | | 11/2004 | Liu et al. |
| 2011/0161038 | A1 | | 6/2011 | Sutherland |
| 2015/0316196 | A1 | | 11/2015 | Farque et al. |

FOREIGN PATENT DOCUMENTS

WO        0016002 A1    3/2000

OTHER PUBLICATIONS

International Search Report and Written Opinion dated Aug. 9, 2016; International PCT Application No: PCT/US2015/059707.

* cited by examiner

*Primary Examiner* — John Olszewski
*Assistant Examiner* — Gerrad A Foster
(74) *Attorney, Agent, or Firm* — McGuireWoods LLP (57) ABSTRACT

The present disclosure provides for a pig tracking and locating system that is able to pinpoint the exact location of a pig so that if the pig becomes stuck, it can be more efficiently located and retrieved without excessive searching. A representative system includes an unmanned underwater vehicle that travels with or very near the pig as it progresses through a pipeline, and gathers and stores information transmitted by the pig. This information may include location data that can be transmitted in the event the pig becomes stuck.

20 Claims, 7 Drawing Sheets

023
PIG TRACKING BY UNMANNED SUBMARINE

FIELD

The Present Disclosure Relates Generally to Tracking a Pig in a Pipeline.

BACKGROUND

Pipeline "pigs", which may alternatively be referred to as pipeline inspection gauges, or pipeline inspection gadgets, are devices that are placed inside of a pipeline to traverse and inspect the pipeline. Pigs may be used in pipelines and subsea pipelines to conduct hydrostatic testing, to conduct cleanup operations, to conduct batch transportation operations, to prevent solid accumulation and corrosion, to apply coatings, and to conduct inspections.

In hydrostatic testing, a pig may be inserted into a pipeline ahead of a fill point, and the pipeline may be filled with water behind the pig. In this manner, the pig may be used to fill the pipeline without entrapping air, and, subsequent to testing, to remove the test waters and to dry the pipeline.

In cleanup operations, a pig may be used to clean solids, scale, wax buildup (paraffin), and other debris from a pipeline wall to keep the line free of occlusions and debris. In batch transportation, pigs may be used as a separator to keep separate batches of product that are being transported by the pipeline. Such products may include gasoline, diesel fuel, fuel oils, and other products.

To prevent accumulation of solids and corrosion, pigs may also be used in crude-oil pipelines to keep water and solids from accumulating in low spots. In addition, in coating operations, pigs may be used to apply internal pipe coatings, such as epoxy coating materials, in operating pipelines. Pigs may also be used to coat the pipeline with corrosion inhibitors.

In addition to the foregoing uses, pigs may also be used as inspection tools. To that end, a gauging or sizing pig may be following a new construction or line repair to determine if there are any internal obstructions, bends, or buckles in the pipe that might merit further repair. A camera may be attached to a pig to allow for visual inspection of the internal surfaces of the pipeline. Pigs may also be outfitted with magnetic and ultrasonic systems that locate and measure internal and external corrosion pitting, dents, buckles, and any other anomalies in the pipeline wall.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In any of the uses of a pig described above, it is possible for the pig to become stuck in the pipeline during operation. A stuck pig may present unique difficulties in the context of a subsea pipeline, in which it may be difficult to determine the exact location of the pig so that it can be extracted. The typical approach for removing a stuck pig is to search for it by disassembling the pipeline. Such a disassembly may be time-consuming, expensive, and, in the case of a subsea pipeline, logistically difficult. The present disclosure provides for a pig tracking and locating system that is able to pinpoint the exact location of a pig so that if the pig becomes stuck, it can be more efficiently located and retrieved without excessive searching.

Figure 1:
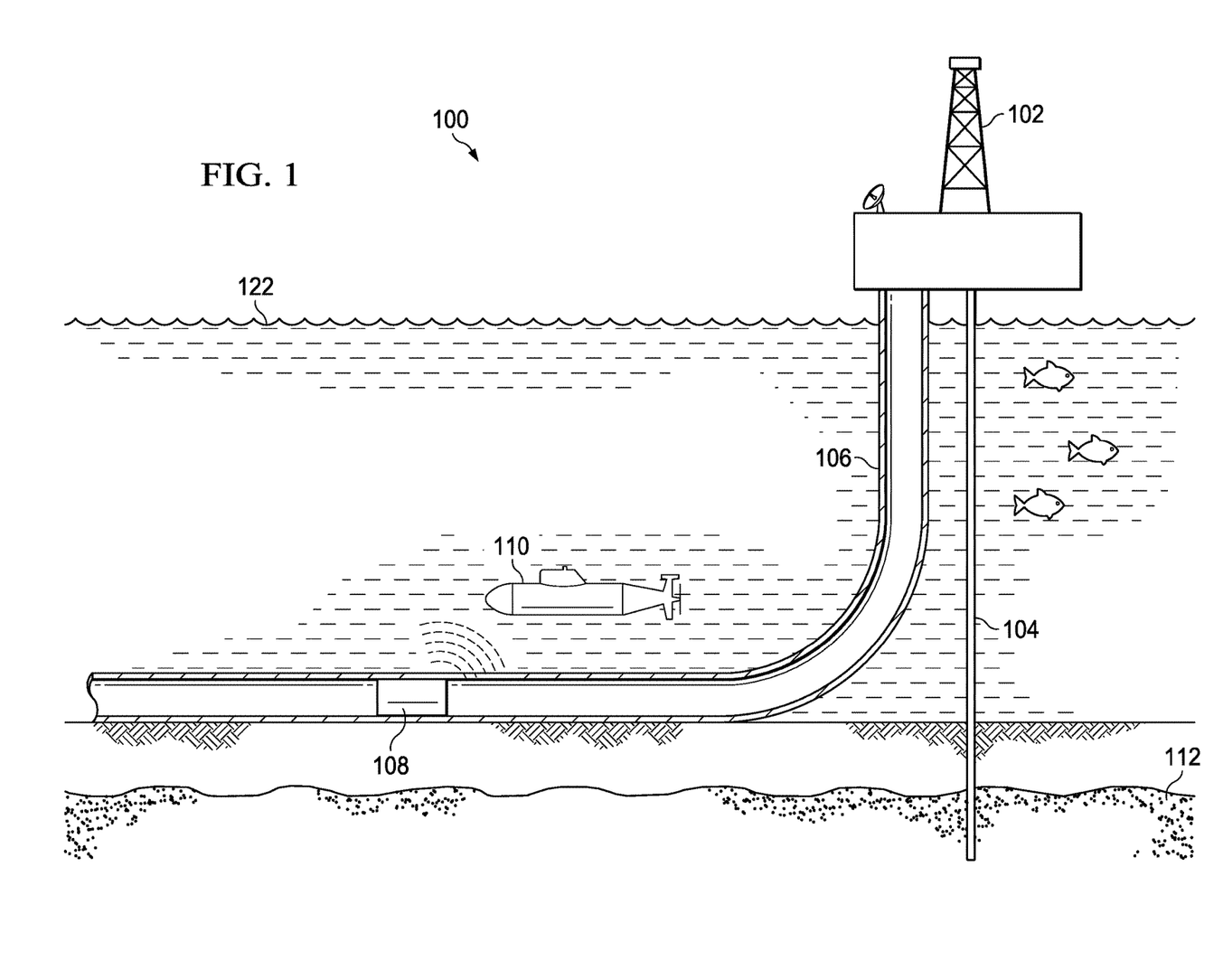
FIG. 1 shows a schematic view of a system for tracking the location of a pig in a pipeline by an unmanned submarine vehicle.

Referring now to the figures, FIG. 1 shows an illustrative system 100 for tracking the location of a pig 108 in a subsea pipeline 106. In the figure, fluid is collected from a subsea formation 112 by a production string 104 that transports the collected fluid to a platform 102, which may also be referred to as a rig. The pipeline 106 conveys the fluid from the platform 102 to a remote collection facility (not shown) for refinement. The pig 108 may be deployed into the pipeline 106 from the platform. In this embodiment, an unmanned submarine vehicle, which may alternatively be referred to as a subsea or underwater drone, or as submarine vehicle 110, is deployable from the platform 102. The submarine vehicle may be also be referred to as a "UUV", or "Unmanned Underwater Vehicle", and is operable to travel through the seawater close to (but outside of) the pipeline, to follow the pig 108.

The submarine vehicle 110 may include a navigation system that enables the submarine vehicle 110 to follow the path of the pipeline 106. In an embodiment, the pig 108 includes a signal generator that periodically emits acoustic signals, or "pings." The submarine vehicle 110 includes a sensor for detecting and receiving the acoustic signals, and is operable to navigate to the surface 122 to transmit data based on the acoustic signals to the platform 102 or another receiver. In some embodiments, the submarine vehicle 110 is powered by aluminum batteries that produce electricity through the dissolving of aluminum in seawater, thereby providing for very long battery life.

The acoustic signals may be a simple locating signal (such as a sonar ping) or may alternatively include information gathered by the pig, such as information indicative of the conditions in the pipeline 106. Such data may be referred to as pipeline data, and may include data relating to defects or physical characteristics of the pipeline, including fluid flow rates, velocity, other measurements (such as temperature and measurements relating to wall properties of the pipeline 106) the presence of corrosion or occlusions, bends, kinks, or other features, in addition to the location of such characteristics. The pipeline data may also be correlated to a linear position or location in the pipeline and a time at which it was gathered by the pig. In addition, the pipeline data may be correlated to a time or location by the submarine vehicle, and used to generate a log of collected data. Further, the acoustic data may include other information relative to the pig 108, including device or component error codes that are indicative of the health of the pig 108 and the amount of power that remains available in a battery of the pig 108. The data might also include information indicating the differential pressure across the pig 108, as an increase in differential pressure may indicate that the pig 108 is stuck or that its path is obstructed. The collected data may also include location data that indicates the location of the pig at one or more points in time. In an embodiment, the pig 108 may include a gyroscope and other sensors to provide the pig 108 with the capability to determine its location, which could then be communicated from the pig 108 in accordance with any of the illustrative systems described herein.

Referring again to FIG. 1, in an embodiment, the submarine vehicle 110 is operable to follow the pig 108 as it travels along the pipeline 106, and the submarine vehicle 110 does not travel to the surface to transmit location data until the submarine vehicle 110 determines that the pig 108 has become stuck. In some embodiments, the submarine vehicle 110 is also operable to communicate, and the pig 108 is operable to receive, acoustic signals from the submarine vehicle 110 to the pig 108. In the foregoing embodiments, the submarine vehicle 110 remains close enough to the pig 108 to detect or "hear" the acoustic signals.

The submarine vehicle 110 may include logic for invoking a number of methodologies for determining the direction in which the submarine vehicle 110 may have to travel to remain close to the pig 108. The first methodology may be to maneuver to a number of locations until the amplitude of the acoustic signals from the pig 108 is determined to be maximized. Here, the increased amplitude would indicate physical proximity to the pig 108. Another methodology involves the submarine vehicle 110 detecting the direction from which the acoustic signals of the pig 108 originated, and causing the submarine vehicle 110 to travel in the direction of signal origination. This methodology may be implemented using directional microphones in the submarine vehicle or external hydrophones, or using several-microphones/hydrophones in or about the submarine vehicle and measuring the time delay between the arrivals of acoustic signals at different microphones.

Additionally, since the layout of the pipeline 106 is likely known, the pipeline path may be pre-programmed into a memory of the submarine vehicle 110. In such an embodiment, the submarine vehicle may include data acquisition systems to receive visual, sonar, or other data to determine a location that may be compared to the pre-programmed in real time to determine the precise location of the pig 108. Alternatively, such visual or sonar data can be used to guide the submarine vehicle to follow the pipeline, using algorithms similar to the "keeping lane" feature in modern automobiles.

Another methodology include using acoustic communication links between the submarine vehicle 110 and two or more acoustic beacons (e.g., buoys 418 of FIG. 4) on the ocean surface 122. In such embodiments, a surface acoustic modem used to communicate with the submarine vehicle 110 can also serve as a beacon. Such beacons may include a built-in satellite navigation system (such as GPS or GLO-NASS) and are operable to transmit their location information to the submarine vehicle 110. By measuring the time required to receive a communication between the submarine vehicle 110 and a surface modem, the distance between the two can be estimated based on the path of the pipeline 106. By measuring the times which acoustic signals need to travel between the submarine vehicle and different surface modems at known positions, the position of the submarine vehicle can be calculated in the same way as in satellite navigation system receivers. In such an embodiment, triangulation will yield the location of the submarine vehicle 110, which may in turn be used a proxy for the location of the pig.

In addition, Doppler-shift may be used to locate the pig 108. In such embodiments, the frequency of the detected acoustic signals is shifted to higher frequencies if the pig 108 and the submarine vehicle 110 are moving towards each other, but shifted to lower frequencies if they are moving apart from each other. The submarine vehicle 110 may also include optic or magnetic detectors to optically or magnetically detect the pipeline 106. The submarine vehicle 110 may also include a sonar detection system that is operable to detect and map the seabed and pipeline.

After the data gets transferred from the pig 108 to the submarine vehicle 110 (where it can be stored on a disk), the submarine vehicle may return to the surface to transmit the data to the control room. In this manner, a transmission from the submarine vehicle 110 may also serve to indicate that the pig 108 is stuck. At such point, the submarine vehicle 110 can also transmit all the information which it previously received from the pig 108. In another embodiment, the submarine vehicle 110 may simply return to the surface upon determining that the pig 108 is not moving, and generate a locating signal that can be used by a locating device, such as a satellite navigation system or a ship or buoy having a locating system, to determine location data indicative of the location of the submarine vehicle 110, which is turn indicative of the location of the pig 108.

Figure 2:
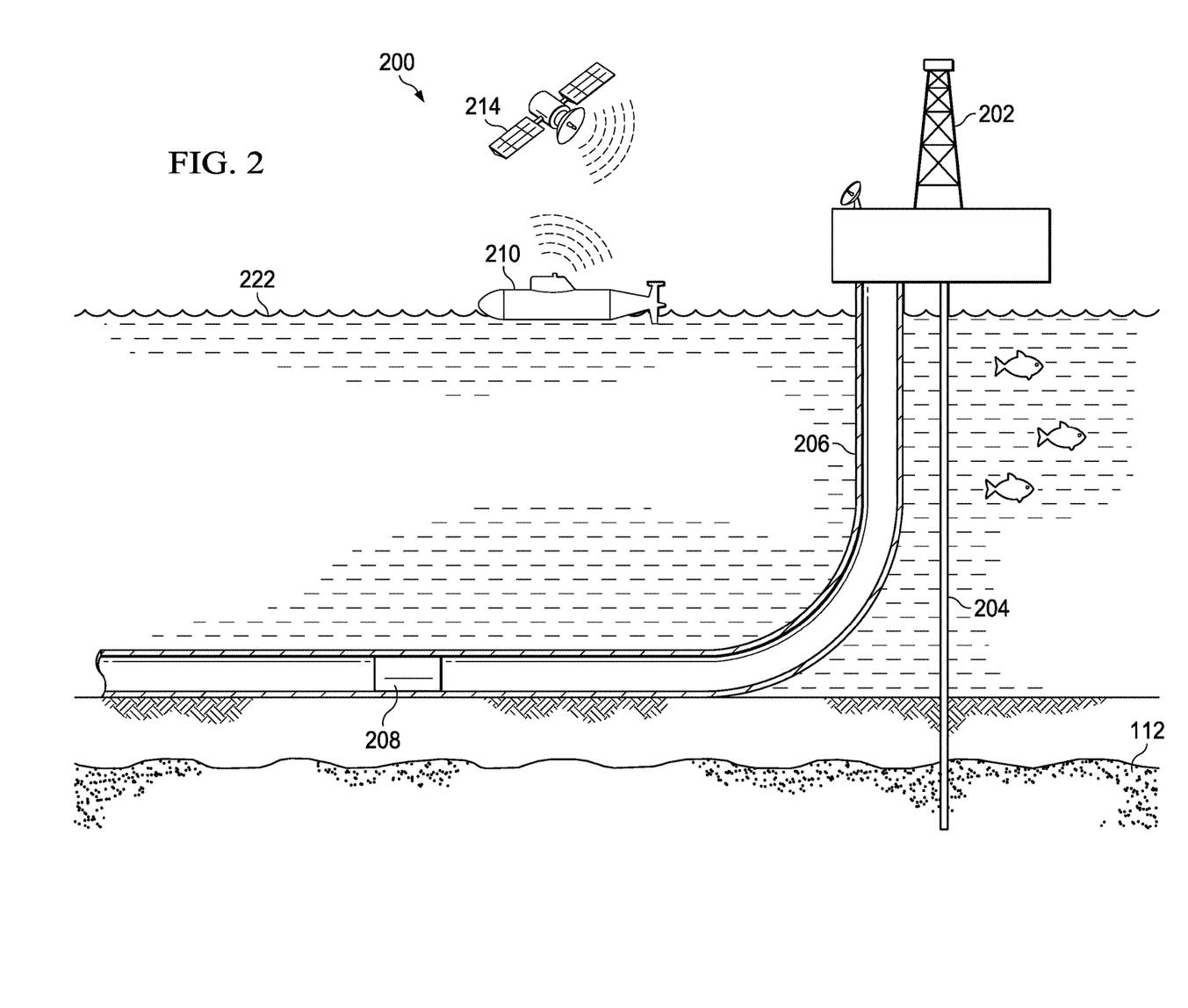
FIG. 2 shows a schematic view of a system for tracking the location of a pig in a pipeline by an unmanned submarine vehicle in which the submarine vehicle is operable to travel to the water's surface to transmit location data to a satellite communication network.

FIG. 2 shows an alternative embodiment of the pig tracking system 200. It is noted that with respect to FIG. 2 and the other drawings, similar components or features may be similarly numbered but indexed by 100, and may not be discussed further. In the embodiment of FIG. 2, the submarine vehicle 210 is operable to travel to the surface 222 to communicate location data and other pipeline data received from or relating to the location of the pig 208. In such an embodiment, the submarine vehicle 210 includes a transceiver, transmitter, or receiver for communicating with a satellite 214 via a suitable radio communication protocol. The satellite 214 may form a portion of a satellite communication network that includes one or more satellites 214, a transmitter (e.g., the submarine vehicle 210 or a control room), and a receiver (e.g., the submarine vehicle 210 or a control room). In an embodiment, the submarine vehicle 210 is operable to communicate the location data and other pipeline data to a controller or control room at the platform 202 or another location via a satellite communications network. In such an embodiment, the submarine vehicle 210 may alternatively utilize an onboard satellite navigation system transceiver to determine its location, and may transmit the submarine vehicle location data, pig location data, and/or the pipeline data directly to a control room at the platform 202. In an embodiment, the submarine vehicle 210 is operable to follow the pig 208 as it travels along the pipeline 206, and the submarine vehicle 210 does not travel to the surface until the submarine vehicle 210 determines that the pig 208 has become stuck.

Figure 3:
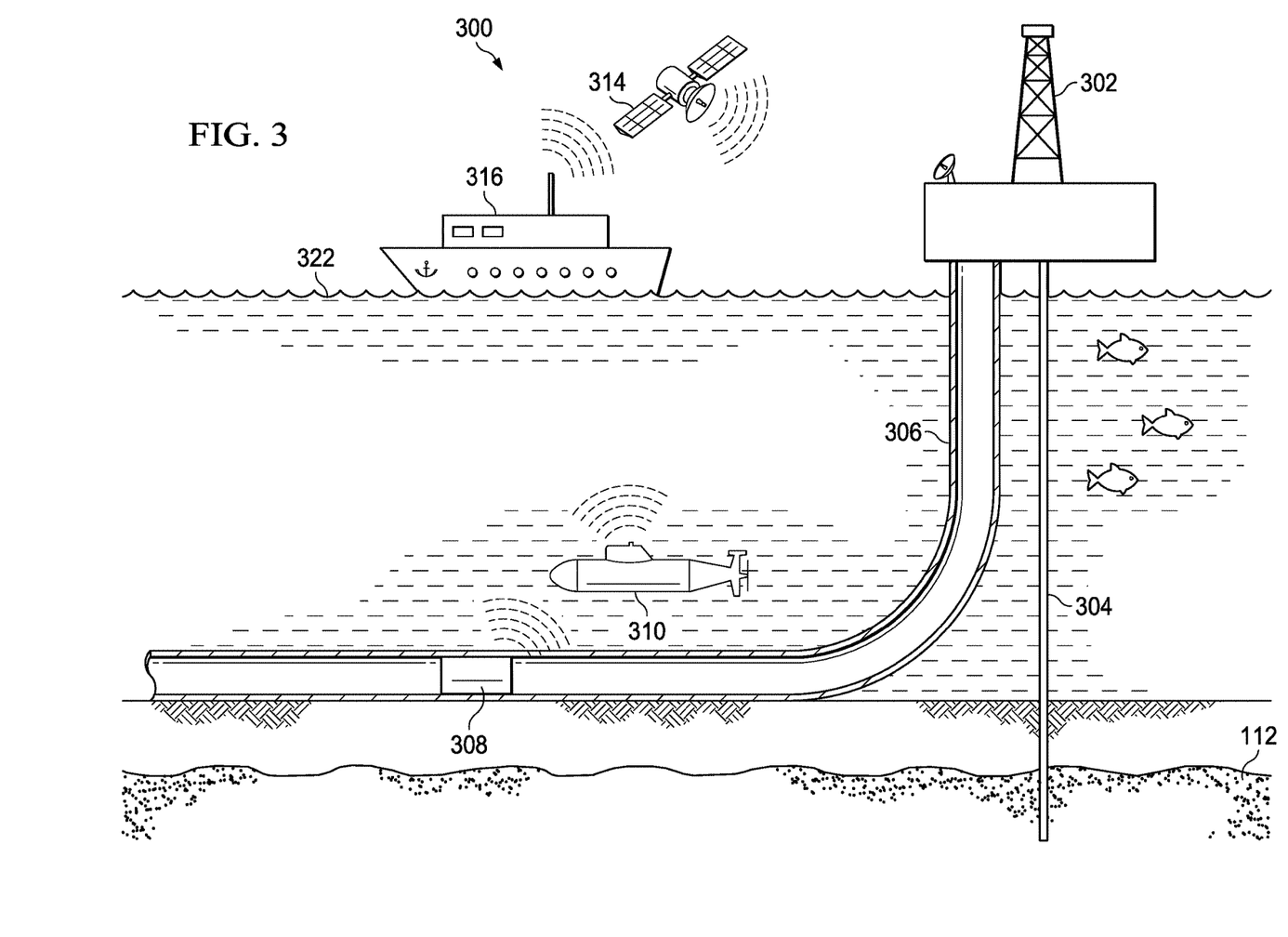
FIG. 3 shows a schematic view of a system for tracking the location of a pig in a pipeline by an unmanned submarine vehicle in which the submarine vehicle is operable to transmit location data to a vessel using water-based telemetry, which then transmits the location data to a satellite communication network.

In the embodiment of FIG. 3, the submarine vehicle 310 is again operable to continuously follow the pig 308. The submarine vehicle receives information from the pig 308 via acoustic signals, and retransmits these signals, or location data and pipeline data based on such signals, to a surface ship 316 which is operable to deploy and service the submarine vehicle 310. The surface ship 316 includes a communication system that is operable to receive location data, pipeline data, and submarine vehicle location data and to transmit the foregoing data to a control room at the platform 302 directly or using a relay satellite 314. In such an embodiment, the surface ship 316 may also continuously determine its own position (which is similar to the position of the submarine vehicle 310 and the pig 308) via a satellite navigation system and include its location in the data which it transmits.

The embodiment of FIG. 3 enables the transmission of data to the control room without the delay of the submarine vehicle 310 travelling to the surface 322. In an embodiment, the surface ship 316 may similarly be an unmanned vehicle that follows and continuously communicates with the submarine vehicle 310. In such embodiments, the pig 308 continually sends acoustic signals to the submarine vehicle 310, and the submarine vehicle 310 then retransmits the data as strong acoustic signals which are received by the surface ship 316. The submarine vehicle 310 is followed by the surface ship 316 in the same manner in which the submarine vehicle 310 follows the pig 308. This configuration, like others described below, provides a real-time communication link between the control room and the pig 308. Moreover, the link may be a two-way communication link that facilitates the transmission of data from the control room to the pig 308. In such an embodiment, the surface ship 316 may communicate over a satellite communication network via satellite 314 or over another suitable radio communication network.

As noted above, in such embodiments, the surface ship 316 may have a satellite navigation system device to provide the location of the surface ship 316 (which is very close to the position of the submarine vehicle 310 and pig 308). The data which the surface ship 316 transmits to the pig 308 via the communications link that includes the submarine vehicle 310 may include the coordinates of the surface ship 316, so that the pig knows its actual position in real time.

The surface ship 316 may be powered by a battery that is similar to that of the submarine vehicle 310. In some embodiments, however, ship may be powered by a combustion engine, by alternative types of batteries, by solar power, by harvesting the energy of waves, or any other suitable energy source or combination thereof.

In some embodiments, a wire may be used to communicatively and electrically couple the surface ship 316 to the submarine vehicle 310. The wire may include copper cables and optionally optical fibers. The wire may be operable to provide power to the submarine vehicle 310 from the surface ship 316, and to transmit data in the place of an acoustic communication link.

Figure 4:
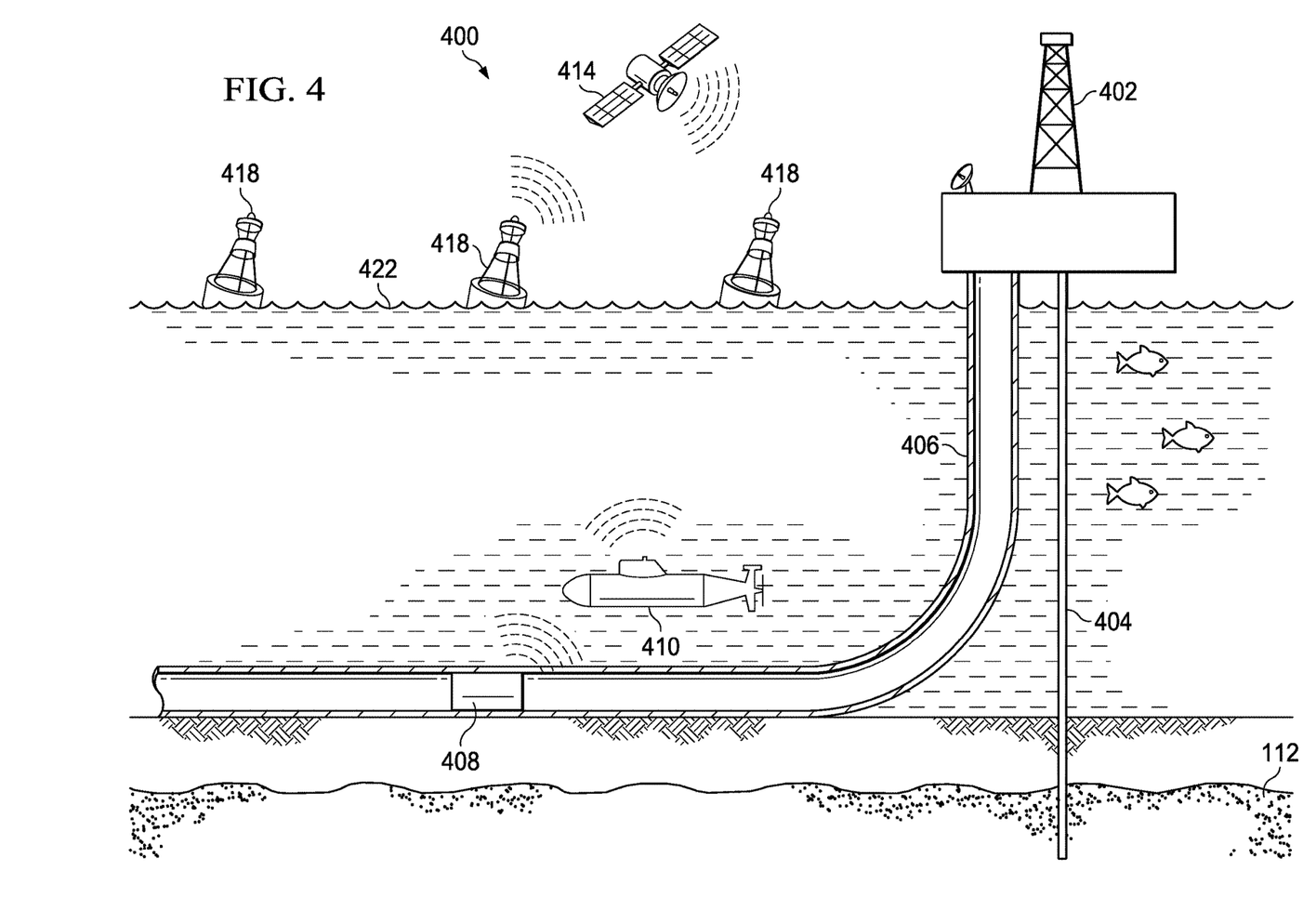
FIG. 4 shows a schematic view of a system for tracking the location of a pig in a pipeline by an unmanned submarine vehicle in which the submarine vehicle is operable to transmit location data to a stationary buoy using water-based telemetry, which then transmits the location data to a satellite communication network.

In the embodiment of FIG. 4, the submarine vehicle 410 remains operable to continuously follow the pig 408 and receive information from the pig 408 via acoustic signals. In the embodiment of FIG. 4, the submarine vehicle 410 retransmits these signals, or location data and pipeline data based on such signals, to one or more buoys 418. Each of the buoys 418 includes a communication system that is operable to receive location data, pipeline data, and submarine vehicle location data and to transmit the foregoing data to a control room at the platform 402 directly or using a relay satellite 414. In such an embodiment, each of the buoys 418 may also continuously determine its own position (which is similar to the position of the submarine vehicle 410 and the pig 408) via a satellite navigation system and include its location in the data which it transmits. In such an embodiment, the buoys 418 may communicate over a satellite communications network via satellite 414, via a device to device communications network that include the buoys 418, submarine vehicle 410, and control room at the platform 402, or via another suitable radio communication network.

In the embodiment of FIG. 4, each buoy 418 may be regarded as fixed position surface acoustic modems, and the buoys 418 may be placed along the path of the pipeline 406. As each buoy 418 receives data from the submarine vehicle 410, the receiving buoy 418 is operable to transmit data to a control room via the satellite 414. The buoys 418 may function similarly to the surface ship 316 of FIG. 3 insofar as the buoys 418 are operable to receive acoustic signals from the submarine vehicle 410, and forward the data included in the acoustic signals to the control room via satellite 414. Like the embodiment of FIG. 3, the buoys 418 may also provide for continuous and two-way communication between the control room and the pig 408.

In an alternative embodiment, strengthened acoustic signals may be generated between the pig 408 and the buoys 418 so that the data from the pig 408 may be received directly at the buoys 418. The submarine vehicle 410 may be optional or omitted in such an embodiment. In the same way, direct acoustic communication might be possible between the pig 308 and the surface ship 316 of FIG. 3, and the submarine vehicle 310 may be omitted in such an embodiment.

Figure 5:
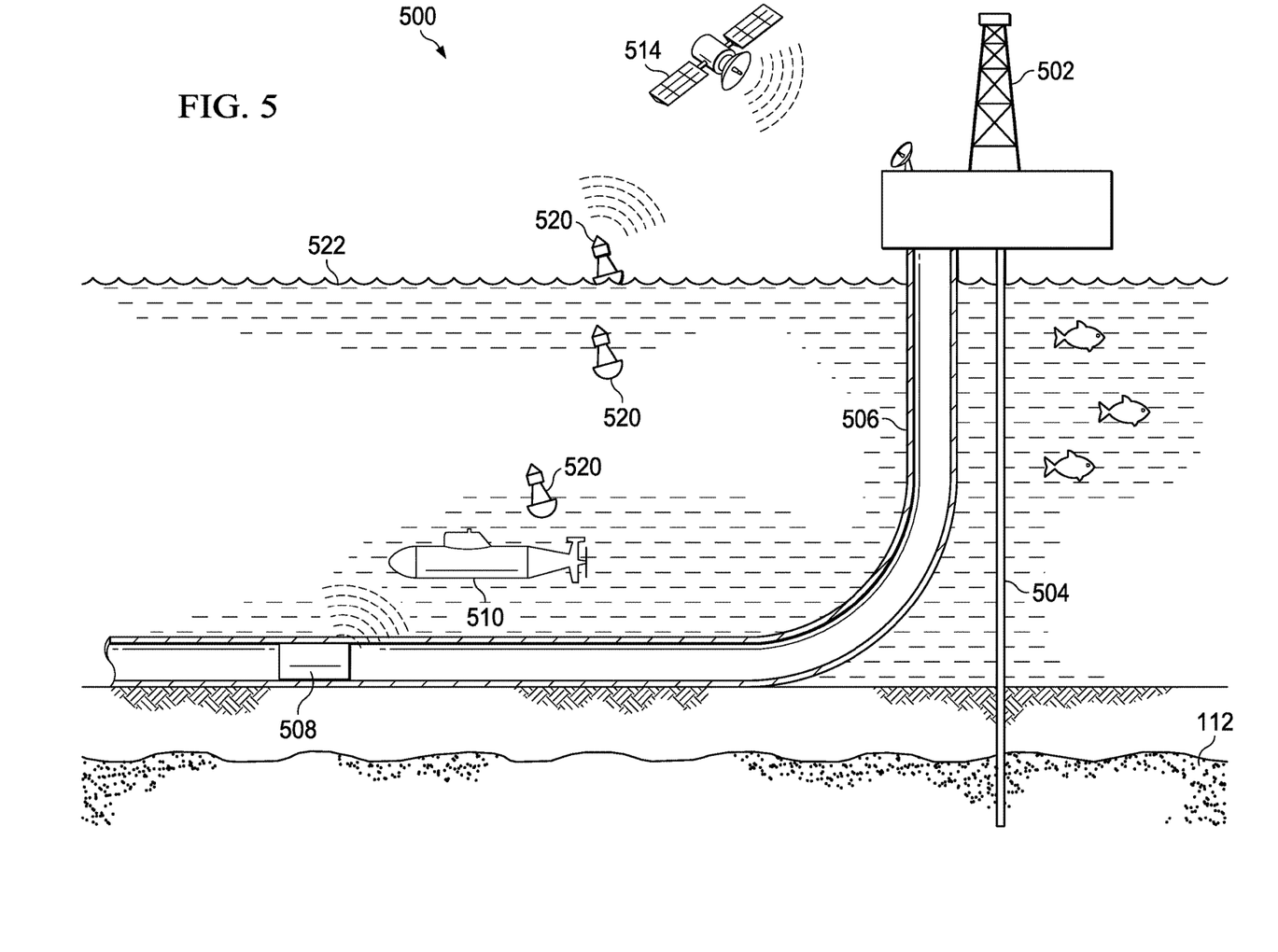
FIG. 5 shows a schematic view of a system for tracking the location of a pig in a pipeline by an unmanned submarine vehicle in which the submarine vehicle releases buoys that float to the surface and are operable to transmit stored information and their own location to a satellite communication network upon reaching the surface.

In the embodiment of FIG. 5, the submarine vehicle 510 is again operable to continuously follow and receive information from the pig 508 via acoustic signals. In this embodiment, the submarine vehicle 510 stores the signals, or location data and pipeline data based on such signals, to one or more releasable buoys 520. Each of the releasable buoys 520 is buoyant in sea water and is therefore operable to return to the surface 522 upon being released. Each of the releasable buoys includes a communication system that is operable to receive location data, pipeline data, and submarine vehicle location data and to transmit the foregoing data to a control room at the platform 502 directly or using a relay satellite 514. Each of the releasable buoys 520 may similarly determine its own position (which is similar to the position of the submarine vehicle 510 and the pig 508) via a satellite navigation system upon surfacing, and include its location in the data which it transmits. In such an embodiment, the buoys 520 may communicate over a satellite communications network via satellite 514, directly with a control room at the platform 502, or over an alternative radio communication network. In such and embodiment, each of the releasable buoys 520 may include an antenna and/or a helium balloon that causes the releasable buoys to rise above the surface 522 of the water to facilitate transmission of radio waves to a satellite 514 or platform 502.

In the embodiment of FIG. 5, the submarine vehicle may release a releasable buoy 520 periodically (e.g., once every fifteen minutes, or every two hours), or upon detection of a release condition, such as a determination being made that the pig 508 is stuck. In some embodiments, the releasable buoys 520 may further be operable to destroy themselves by, for example, releasing air or gas from a flotation device, so that it sinks to the bottom of the sea.

In such embodiments, the position at which each releasable buoy 520 reaches the surface is essentially the same as the position of the pig 508 at the time when the releasable buoy 520 was released. As such, the satellite navigation system coordinates of the releasable buoy 520 may serve as an indicator of the position of the pig 508.

Figure 6:
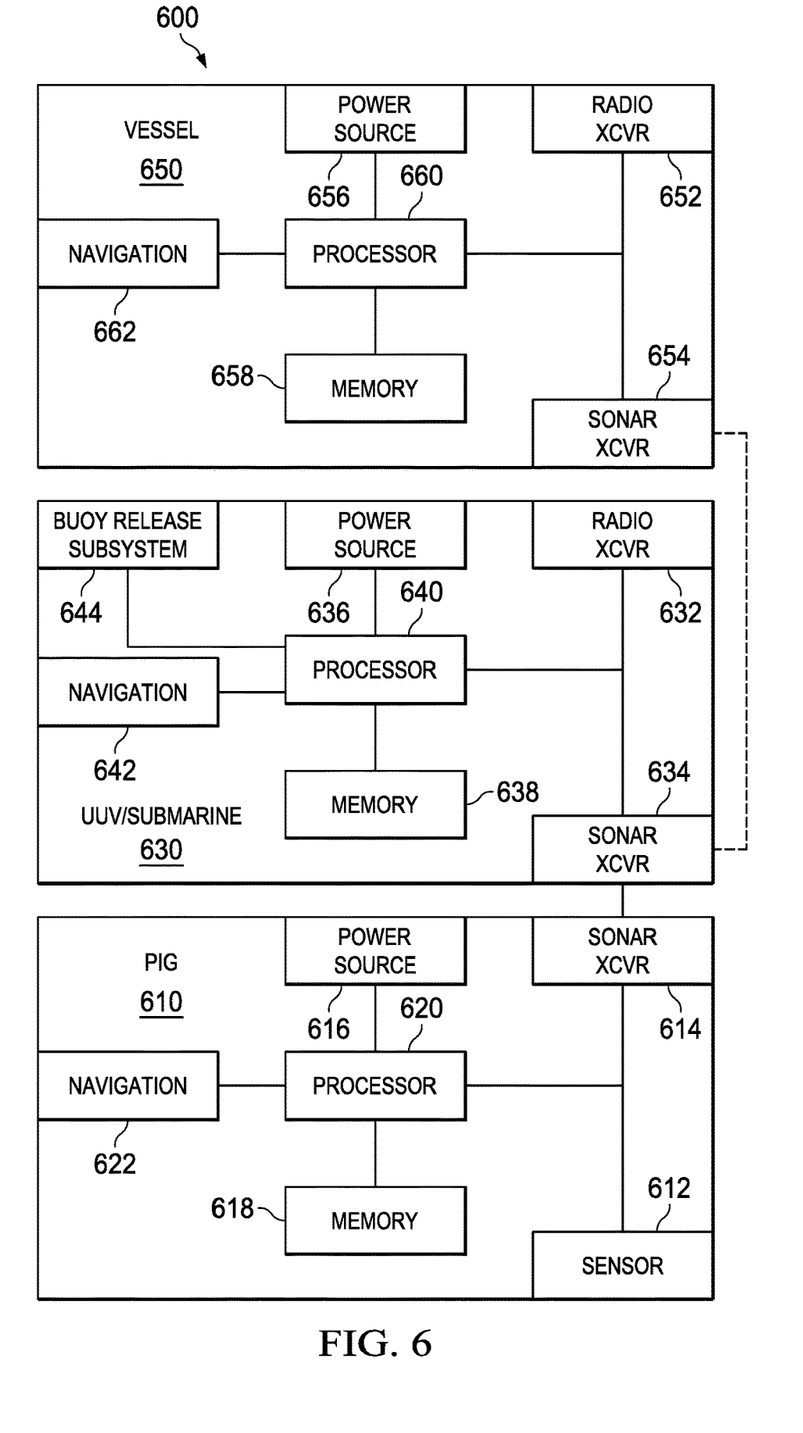
FIG. 6 is a block diagram of a representative system for operating a pig tracking submarine vehicle.

FIG. 6 shows a block diagram of a representative system 600 having the architecture necessary to provide the functionality described above with regard to FIGS. 1-5. The system 600 includes a pig 610 that in some instances might include an optional navigation system 622 or possibly an optional propulsion mechanism for traversing a pipeline. The pig 610 includes a sensor 612 for monitoring characteristics of the pipeline, such as those described above. The pig 610 also includes a power source 616, a processor 620, and a memory 618. The power source 616 provides power to the components of the pig 610 and the memory stores operating instructions and measurements gathered by the sensor 612, which may include a plurality of sensors to monitor the various pipeline characteristics. The pig 610 also includes a sonar transceiver 614 or similar transceiver or transmitter for emitting acoustic signals that can be detected and recorded by a submarine vehicle 630.

The system 600 also includes a submarine vehicle 630 having a memory 638, processor 640, and power source 636. The power source 636 may be a battery and is used to supply power to the components of the submarine vehicle 630. The memory 638 includes operating instructions that may be implemented by the processor 640. The submarine vehicle 630 includes a sonar transceiver 634 or other suitable transceiver, transmitter, or receiver for communicating with, for example, a sonar transceiver 614 (or transmitter) of the pig 610. The submarine vehicle 630 may communicate pipeline data (including location data) to a controller or control room via an acoustic signal or a radio signal. To communicate via a radio signal, the submarine vehicle 630 may travel to the surface and transmit the pipeline data to the control room directly or indirectly using a telecommunications system using a radio transceiver 632 or transmitter to transmit a radio signal to a communications network or directly to a control room. To communicate via an acoustic signal, the submarine vehicle 630 may remain submerged and transmit acoustic signals including the pipeline data to a vessel or buoy at the surface using the sonar transceiver 634 or transmitter. In other embodiments, the submarine vehicle 630 includes an optional buoy release subsystem 644 that operates in the manner described above with regard to FIG. 5.

In embodiments of system 600 that involve using a vessel 650 to transmit data, the system 600 includes the vessel 650 (e.g., a buoy or surface ship), which in turn includes a memory 658, a processor 660, and a power source 656. The vessel 650 also includes a navigation system 662 to navigate the vessel 650 close to the submarine vehicle 630. In addition, the vessel 650 includes a sonar transceiver 654 or receiver for receiving acoustic signals from the submarine vehicle's sonar transceiver 634 and or pig's sonar transceiver 614, and a radio transceiver 652 for communicating with a control room or controller (not shown).

Figure 7:
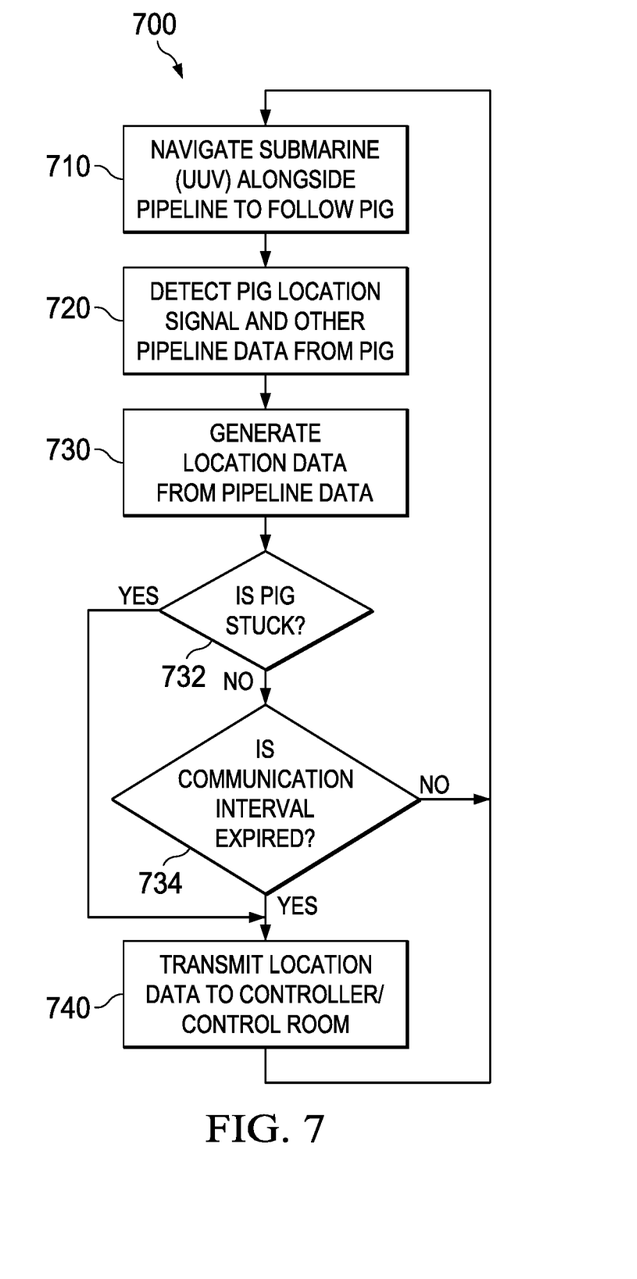
FIG. 7 is a flow chart showing a process for operating the system of FIG. 7.

An illustrative process 700 for tracking and relaying pipeline data that includes the location of a pig is shown in the flow chart of FIG. 7. The process 700 includes navigating an unmanned underwater vehicle (UUV) or submarine vehicle alongside a pipeline 710 to maintain a position proximate to the pig. The process also includes detecting a pig location signal and (optionally) other pipeline data from the pig 720. As referenced herein, the pig location signal may be a signal indicating the location of the pig as determined by the pig, or a ping or more simple signal that simply indicates the presence of the pig, and which may be analyzed by the submarine vehicle or other electronics to determine the location of the pig based on a determined or estimated origin of the signal. The pipeline data is used to generate location data 730. The process may include making a determination as to whether the pig is stuck 732. If the pig is stuck, the process includes transmitting the location data to a controller or control room 740 so that the location of the pig may be used for recovery and any necessary pipeline repair. Similarly, the process may include making a determination as to whether a communication interval has expired 734. If the interval has expired, the process includes transmitting the location data to a controller or control room 740 for analysis. In any event, following the transmission of data 740 or negative results to determinations 732 and 734, the submarine vehicle may continue to navigate alongside the pipeline 710 to follow the pig so that the process 700 may repeat until the pig reaches the end of the pipeline.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. Similarly, the term "memory" should be understood to include at least one machine or computer readable medium (storage medium) to store instructions for executing processes and operating components and subsystems as described herein. Examples of storage mediums include, but are not limited to, read-only memory (ROM), random access memory (RAM), flash memory, magnetic hard drives, solid state hard drives, CD-ROM drives, DVD drives, floppy disk drives, as well as other types of similar storage medium. In addition, the steps and components described in the above embodiments and figures are merely illustrative and do not imply that any particular step or component is a requirement of a claimed embodiment.

In view of the foregoing, it is noted that the present disclosure may be understood to include at least the following illustrative embodiments and clauses.

In accordance with an illustrative embodiment, a subsea pipeline pig tracking system includes a pig; and an unmanned submarine vehicle. The submarine vehicle is operable to automatically receive data from the pig and return to a position that is within communication range of an access point to relay data to a controller. In such an embodiment, the access point may be a surface ship or buoy that is communicatively coupled to a communications network, and the range may be the communication range of a communication medium used to exchange data between the access point and the submarine vehicle. Alternatively, the access point may be a communications satellite, a radio tower, or a receiver at a controller or control room. To that end, the unmanned submarine vehicle includes a transmitter for transmitting location data to at least one of a satellite communication network and a control room using a suitable RF communication protocol. A controller is located at a control room and is coupled to a communication network to receive the location data.

In an embodiment, the unmanned submarine vehicle includes a sonar signal generator or acoustic source and the access point is a surface relay for receiving location data or an acoustic signal from the acoustic source and transmitting the location data derived from the signal to the controller. The surface relay may be a vessel or a floating buoy that is moored or otherwise operable to remain in approximately the same location.

In another embodiment, the submarine vehicle includes one or more releasable buoys. The buoys are operable to transmit location data which may be downloaded to the buoy from the submarine vehicle prior to release of the buoy.

In accordance with another illustrative embodiment, a method of tracking a pig location in a subsea pipeline includes navigating an unmanned submarine vehicle along a subsea pipeline, receiving a pig location signal from the pig, generating location data from the pig location signal, and transmitting location data derived from the pig location signal to a controller. In such an embodiment, the pig location data may be exact location data or a simple ping or acknowledge signal, and the location data may be location data determined based on the location of the most recent ping or data otherwise derived from the pig location signal. The method may include navigating the unmanned submarine vehicle to a water surface to transmit the location data.

In another embodiment, the method includes transmitting the location data to a satellite or other communication device, and receiving the location data at a controller via the satellite or other communication device. In another embodiment, the method further includes transmitting a sonar signal from the unmanned submarine vehicle to a surface relay, and communicating with a satellite navigation system to determine a location based on the location of the most recently received sonar signal. As described above, the surface relay may be a vessel, a stationary buoy, or a similar object having the requisite communications capabilities.

In another embodiment, the method includes releasing a releasable buoy having a memory and a radio transmitter. The releasable buoy is operable to store the location data received from the submarine vehicle or pig, and to transmit the location data upon reaching the surface.

In accordance with another illustrative embodiment, a subsea pipeline pig tracker includes an unmanned submarine vehicle having a controller, a transmitter, a receiver, a power supply, a memory, and a navigation system. The memory includes instructions for navigating the unmanned submarine vehicle along a path of a subsea pipeline. The receiver is operable to receive a location signal from a pig, and the memory includes instructions for returning to a water surface to transmit location data based on the location signal received from the pig. The transmitter may be a radio transceiver or a satellite navigation system transceiver or transmitter for transmitting location data to a satellite or over an alternative RF communication system to a controller. In an embodiment, the unmanned submarine vehicle includes a sonar signal generator or acoustic source for transmitting location data or a location signal to a surface relay, which may be a vessel or a buoy.

In another embodiment, the subsea pipeline pig tracker further includes a plurality of releasable buoys. Each of the releasable buoys includes a power source, a controller, a memory, and a transmitter. The memory of the subsea pipeline pig tracker includes instructions for storing location data to the memories of the plurality of releasable buoys and releasing the releasable buoys to the surface. Upon reaching the surface, each of the plurality of releasable buoys is operable to transmit the stored location data upon reaching the surface.

The disclosure may also be understood to include at least the following clauses:

Clause 1: A subsea pipeline pig tracking system comprising a pig having a signal generator; and a submarine vehicle comprising a receiver operable to receive a signal generated by the signal generator and a navigation system operable to follow the pig along a subsea pipeline in response to the receiver receiving the location signals.

Clause 2: The system of Clause 1, wherein the submarine vehicle is operable to automatically receive data from the pig, and return to a position that is within communication range of an access point to relay data to a controller.

Clause 3: The system of Clause 2, wherein the access point is selected from the group consisting of: a homing beacon, a floating platform, and a vessel.

Clause 4: The system of any of Clauses 1-3, wherein the submarine vehicle comprises a transmitter for transmitting location data to at least one of a satellite communication network and a control room, the system further comprising a controller operable to receive the location data.

Clause 5: The system of any of Clauses 1-4, wherein the submarine vehicle comprises an acoustic source operable to transmit location data, and further comprising: a controller for receiving location data indicative of a location of the pig; and a surface relay operable to receive the location signal from the acoustic source, determine the location data, and to transmit the location data to the controller.

Clause 6: The system of Clause 5, wherein the surface relay comprises a vessel.

Clause 7: The system of Clause 5, wherein the surface relay comprises a stationary buoy.

Clause 8: The system of Clause 5, wherein the submarine vehicle comprises at least one releasable buoy, which is capable of transmitting location data.

Clause 9: A method of tracking a pig location in a subsea pipeline comprising: navigating a submarine vehicle along a subsea pipeline; receiving a pig location signal from a pig; generating location data from the pig location signal; and transmitting location data derived from the pig location signal to a controller.

Clause 10: The method of Clause 9, further comprising navigating the submarine vehicle to the water surface to transmit a submarine vehicle location signal upon determining that the pig is stuck, the method further comprising generating the location data from the submarine vehicle location signal.

Clause 11: The method of Clause 9, further comprising transmitting the submarine vehicle location signal to a satellite.

Clause 12: The method of Clause 11, further comprising receiving the location data from the satellite at a controller.

Clause 13: The method of any of Clauses 9-12, further comprising transmitting a sonar signal from the submarine vehicle to a surface relay.

Clause 14: The method of Clause 13, further comprising transmitting a satellite navigation system signal to a satellite communication network from the surface relay, the method further comprising generating the location data from the satellite navigation system signal.

Clause 15: The method of Clause 13, wherein the surface relay comprises a vessel.

Clause 16: The method of Clause 13, wherein the surface relay comprises a stationary buoy.

Clause 17: The method of any of Clauses 9-16, further comprising releasing a releasable buoy, the releasable buoy comprising a radio transmitter operable to transmit a buoy location signal, the method further comprising generating the location data based on the buoy location signal.

Clause 18: A subsea pipeline pig tracker comprising a submarine vehicle having: a controller; a transmitter; a receiver; a power supply; a memory; and a navigation system, wherein the memory comprises instructions for navigating the submarine vehicle along a path of a subsea pipeline.

Clause 19: The subsea pipeline pig tracker of Clause 18, wherein the receiver is operable to receive a location signal from a pig, and wherein the memory comprises instructions for causing the submarine vehicle to return to the water surface to transmit a submarine vehicle location signal.

Clause 20: The subsea pipeline pig tracker of any of Clauses 18 or 19, wherein the transmitter comprises a satellite transmitter for transmitting location data to a satellite.

Clause 21: The subsea pipeline pig tracker of any of Clauses 18-20, wherein the submarine vehicle comprises an acoustic source operable to transmit a location signal to a surface relay.

Clause 22: The subsea pipeline pig tracker of any of Clauses 18-21, further comprising a plurality of releasable buoys, wherein each of the releasable buoys comprises a power source and a transmitter, wherein the memory of the subsea pipeline pig tracker comprises instructions releasing at least one of the releasable buoys to the surface in response to determining that the pig is stuck within a pipeline, and wherein each of the plurality of releasable buoys is operable to transmit a buoy location signal upon reaching the surface.

Clause 22: The system of any of Clauses 1-8, wherein the submarine vehicle is an unmanned underwater vehicle.

The invention claimed is:

1. A subsea pipeline pig tracking system comprising:
a pig having a signal generator and a two-way communication link; and
a submarine vehicle comprising a receiver operable to receive pig location signals generated by the signal generator and a navigation system operable to navigate the submarine vehicle to continuously follow the pig while outside of a subsea pipeline in which the pig is disposed in response to the receiver receiving the pig location signals.

2. The system of claim 1, wherein the submarine vehicle is operable to automatically receive the pig location signals from the pig, and to travel to a position that is within communication range of an access point to relay pig location data to a controller upon determining that the pig has become stuck.

3. The system of claim 2, wherein the access point is selected from the group consisting of: a buoy or surface ship, and wherein the submarine vehicle is an unmanned submarine vehicle.

4. The system of claim 1, wherein the submarine vehicle comprises a transmitter for transmitting the pig location data to at least one of a satellite communication network and a control room, the system further comprising a controller operable to receive the pig location data.

5. The system of claim 1, wherein the submarine vehicle comprises an acoustic source operable to transmit the pig location signal, the system further comprising:
a controller for receiving pig location data indicative of a location of the pig;
a surface relay operable to receive the pig location signal from the acoustic source, determine the pig location data, and to transmit the pig location data to the controller.

6. The system of claim 5, wherein the surface relay comprises a surface ship.

7. The system of claim 5, wherein the surface relay comprises a buoy.

8. The system of claim 1, wherein the submarine vehicle comprises at least one releasable buoy having a transmitter for transmitting the pig location data.

9. A method of tracking a pig location in a subsea pipeline comprising:
navigating a submarine vehicle outside of the subsea pipeline to continuously follow a pig disposed in the subsea pipeline;
receiving a pig location signal from the pig; wherein the pig comprises a two-way communication link;
generating pig location data from the pig location signal; and
transmitting pig location data derived from the pig location signal to a controller.

10. The method of claim 9, further comprising navigating the submarine vehicle to a water surface to transmit a submarine vehicle location signal indicative of the submarine vehicle location upon determining that the pig is stuck, the method further comprising generating the pig location data from the submarine vehicle location signal.

11. The method of claim 10, further comprising transmitting the submarine vehicle location signal to a satellite.

12. The method of claim 11, further comprising receiving the pig location data from the satellite at the controller.

13. The method of claim 9, further comprising transmitting a sonar signal from the submarine vehicle to a surface relay.

14. The method of claim 13, further comprising transmitting a satellite navigation system signal to a satellite communication network from the surface relay, the method further comprising generating the pig location data from the satellite navigation system signal.

15. The method of claim 13, wherein the surface relay comprises a surface ship.

16. The method of claim 13, wherein the surface relay comprises a buoy.

17. The method of claim 9, further comprising releasing a releasable buoy, the releasable buoy comprising a radio transmitter operable to transmit a buoy location signal, the method further comprising generating the pig location data from the buoy location signal.

18. A subsea pipeline pig tracker comprising a submarine vehicle having:
a controller;
a transmitter;

a receiver;
a power supply;
a memory; and
a navigation system configured to navigate the submarine vehicle to continuously follow a pig while outside of a subsea pipeline in which the pig is disposed;
wherein the memory comprises instructions for navigating the submarine vehicle along a path of the subsea pipeline in response to detecting a location signal from the pig.

19. The subsea pipeline pig tracker of claim 18, wherein the receiver is operable to receive a location signal from the pig, and wherein the memory comprises instructions for causing the submarine vehicle to return to a water surface to transmit a submarine vehicle location signal.

20. The subsea pipeline pig tracker of claim 18, further comprising a plurality of releasable buoys,
wherein each of the releasable buoys comprises a power source and a transmitter,
wherein the memory of the subsea pipeline pig tracker comprises instructions releasing at least one of the releasable buoys to the surface in response to determining that the pig is stuck within the subsea pipeline, and
wherein each of the plurality of releasable buoys is operable to transmit a buoy location signal upon reaching the surface.

* * * * *